SINGLE-STATION MULTIPURPOSE BODY-EXERCISING MACHINE

Original Filed April 21, 1969 4 Sheets-Sheet 1

WALTER MARCYAN
INVENTOR
WHANN & McMANIGAL
Attorneys for Applicant
BY

SINGLE-STATION MULTIPURPOSE BODY-EXERCISING MACHINE

Original Filed April 21, 1969 4 Sheets-Sheet 2

WALTER MARCYAN
INVENTOR
WHANN & McMANIGAL
Attorneys for Applicant
BY

SINGLE-STATION MULTIPURPOSE BODY-EXERCISING MACHINE

Original Filed April 21, 1969 4 Sheets-Sheet 3

WALTER MARCYAN
INVENTOR
WHANN & McMANIGAL
Attorneys for Applicant
BY

SINGLE-STATION MULTIPURPOSE BODY-EXERCISING MACHINE

Original Filed April 21, 1969 4 Sheets-Sheet 4

WALTER MARCYAN
INVENTOR
WHANN & McMANIGAL
Attorneys for Applicant
BY

United States Patent Office

Re. 28,066
Reissued July 9, 1974

28,066
SINGLE-STATION MULTIPURPOSE BODY-EXERCISING MACHINE

Walter Marcyan, 3055 Hollywell Place,
Glendale, Calif. 91206

Original No. 3,635,472, dated Jan. 18, 1972, Ser. No. 817,729, Apr. 21, 1969. Application for reissue Feb. 1, 1973, Ser. No. 328,789
Int. Cl. A63b *21/00*
U.S. Cl. 272—81 8 Claims

Matter enclosed in heavy brackets [ ] appears in the original patent but forms no part of this reissue specification; matter printed in italics indicates the additions made by reissue.

ABSTRACT OF THE DISCLOSURE

An exercising machine comprising an upright supporting structure, vertical tracks associated with the upright supporting structure, a carriage which slides vertically upwardly and downwardly on the vertical tracks, a lifting arm rigidly but removably connected to the carriage at any selected one of a plurality of vertically spaced connection points, and adjustable resistance means associated with the carriage to bias the carriage and lifting arm in a vertically downward direction, downward movement of the carriage being limited by stop elements.

BACKGROUND OF INVENTION

The use of progressive resistance exercises for therapeutic and rehabilitative purposes and the use of progressive resistance exercises involving heavy weights for marked increases in strength and endurance were developed and employed during World War II. Since that time the use of progressive increases in weight has grown in popularity in university, college, and high school physical education programs and athletic departments.

Exercising the muscles against progressively increasing weights not only results in the development of strength and endurance of the muscles, but in the improvement of neuromuscular coordination and more efficient functioning of the cardiovascular and respiratory systems.

Apparatus such as dumbbells and barbells have long been employed for progressive resistance exercises. However, shortcomings, such as strains, hazards, and balancing problems attend the use of dumbbells and barbells.

Certain disadvantages are incident to a multistation exercise machine which incorporates a supine press station, a sitting press station and a squat station, or possibly more stations. A multistation exercising machine requires considerable floor space and is therefore not suitable for use in a relatively small area. A multistation exercising machine, compared to a single-station exercising machine, is expensive to manufacture.

SUMMARY OF INVENTION

The present invention features a single-station body-exercising machine—for selectively exercising and developing isolated muscles, such as the leg, back, shoulder, chest or arm muscles—that is adapted for use in a relatively small area, such as a room of a home. The single-station body-exercising machine is comprised of an upright supporting structure having vertical track means; a vertically reciprocative carriage mounted in, and guided by, said track means, and restrained against pivotal movement; adjustable weight means supported in said upright structure; connecting means connected to said carriage and said adjustable weight means whereby said carriage is biased in a vertically downward direction; and body-engaging means, said body-engaging means being moveable only in a vertical straight line direction and adjustable whereby said body-engaging means may be adjusted into different starting positions. The adjustability of the body-engaging means into different starting positions enables the user to quickly change the single station of the exercising machine to a squat station, a toe raise station, an upright row station, a dead lift station, a shoulder shrug station, a sitting press station, a standing press station or a supine press station.

An important feature of the exercising machine of the present invention is the straight line of travel from a position of complete muscle contraction to a position of complete muscle extension presented thereby. The disadvantages of an arcuate path of travel are, therefore, completely eliminated.

It is an object of the present invention to provide a multipurpose single-station exercising machine which occupies relatively little floor space and is, therefore, especially suitable for home use.

Another object is to provide an exercising machine which presents a constant resistance from a position of complete muscle contraction to a position of complete muscle extension.

Another object is to provide an exercising machine which presents a straight line of travel from a position of complete muscle contraction to a position of complete muscle extension to enable the user to center his body during the entire thrust, from contraction to extension.

Another object is to provide an exercising machine which avoids strains, hazards and balancing problems by presenting a straight line of travel from a position of complete muscle contraction to a position of complete muscle extension.

DESCRIPTION OF THE PREFERRED EMBODIMENTS

There is shown in FIGS. 1–14 an exercising machine, comprised of a supporting frame structure, generally designated as 20, a carriage, generally designated as 21, a pair of vertical parallel guide members or tracks, generally designated as 22 and 23, a lifting arm generally designated as 24, and weights generally designated as 25.

Figure 1:
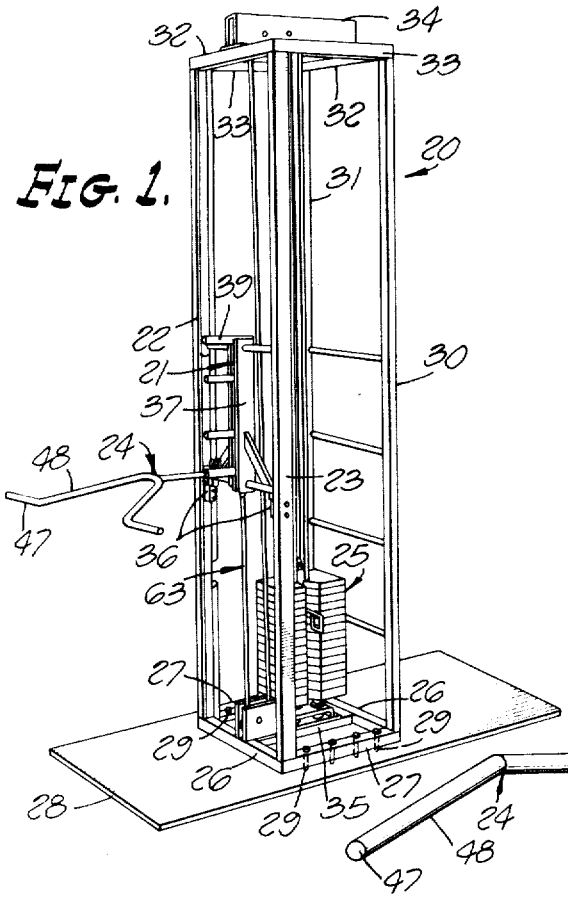
FIG. 1 is a perspective view of an apparatus embodying the principles of the invention.
Figure 2:
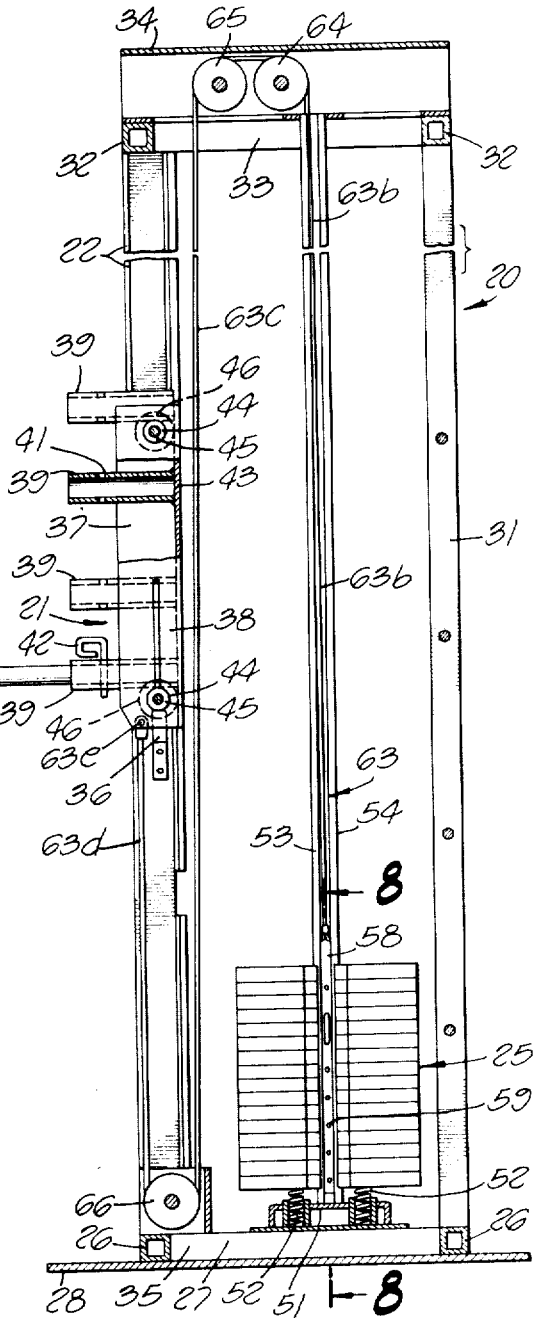
FIG. 2 is an enlarged view in side elevation of an apparatus embodying the principles of the invention.
Figure 4:
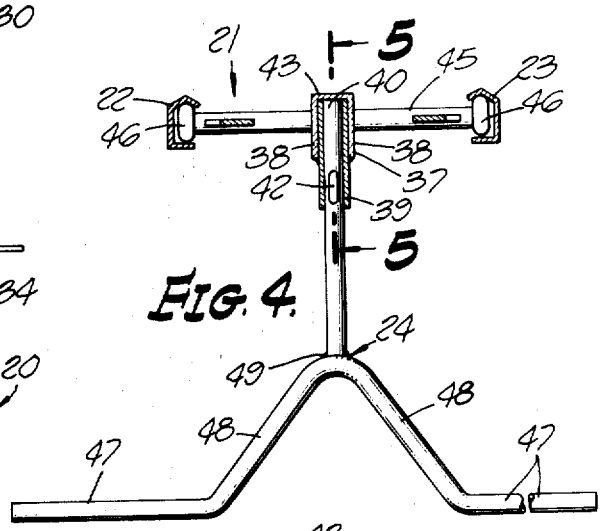
FIG. 4 is a plan view in section taken along the line 4—4 of FIG. 3.
Figure 13:
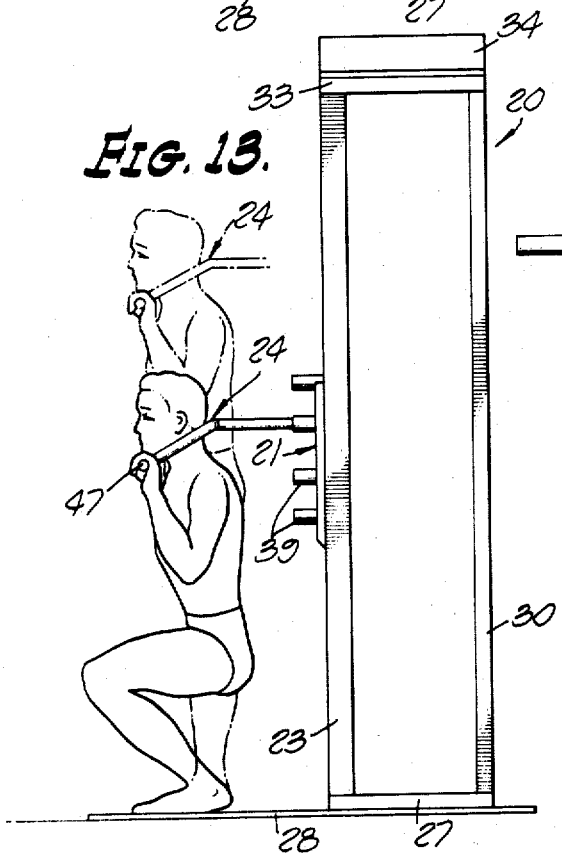
FIG. 13 is a view in side elevation of an apparatus embodying the principles of the present invention being used to execute a squat.
Figure 5:
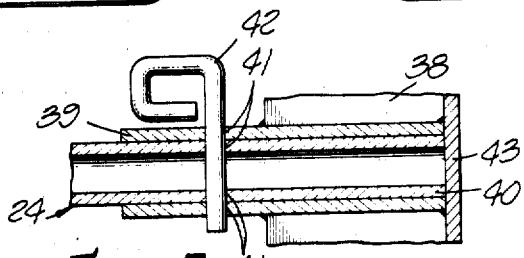
FIG. 5 is a side view in section taken along the line 5—5 of FIG. 4.

Referring particularly to FIGS. 1 and 2, the supporting frame structure 20 includes a pair of horizontal spaced parallel front and back base members 26, interconnected by a pair of horizontal spaced parallel side base members 27. The base members are adapted to rest on the horizontal platform 28, and the base members 27 are connected to the platform 28 by bolts 29. The supporting frame structure 20 also includes four rectangularly arranged vertical corner members. The front corner members 22 and 23 are secured to the base members and ex- vertically upwardly therefrom. The front corner members 30 and 31 are secured to the base members and extend vertically upwardly therefrom. The front corner members 22 and 23 and the back corner members 30 and 31 are interconnected at their upper ends by a pair of horizontal spaced parallel upper front and back members 32 and a pair of horizontal spaced parallel upper side members 33. Extending between the spaced parallel upper front and back members 32 is an upper pulley support 34. Extending between the spaced parallel front and back base members 26 is a pulley support and weight platform 35. The front corner members 22 and 23 are constructed so as to provide tracks or guides for the carriage 21. This feature, which is best seen in FIG. 4, will be discussed in more detail below. The front corner members 22 and 23 include stop means 36 to prevent the carriage 21 from travelling below a predetermined height.

Figure 3:
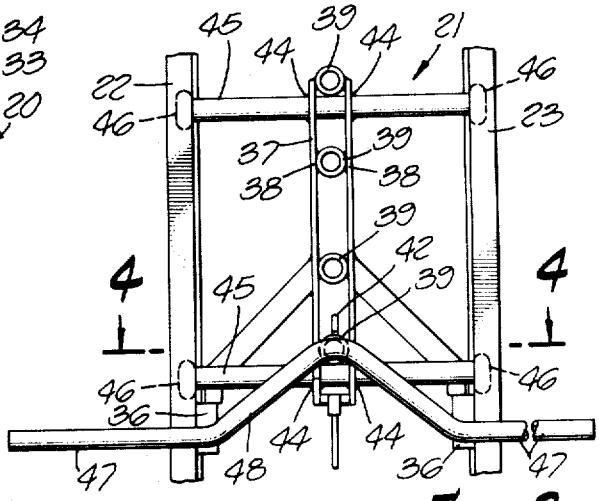
FIG. 3 is a view in front elevation of details of one embodiment of a carriage and lifting arm for the apparatus of FIG. 2.

Referring particularly to FIGS. 2, 3 and 4 the carriage 21 includes a central body portion 37 comprising two spaced elongated parallel sideplates 38. The sideplates 38 are spaced apart and secured to a plurality of parallel vertically aligned cylindrical tubes (sockets) 39. The sockets 39 are adapted to receive the inner end 40 (FIG. 6) of the lifting arm 24. The inner end 40 of the lifting arm 24 and the sockets 39 are provided with vertical holes 41 which register for receiving the pin 42 to secure the lifting arm 24 in position. The sockets 39 are provided with stops 43 to immediately align the vertical holes 41 of the lifting arm and the sockets.

The sideplates 38 are provided with lower and upper vertically aligned coaxial openings 44 which are adapted to receive, in secured relationship, two cylindrical tubes 45. The cylindrical tubes 45 serve as axles upon which double rolled ball bearing wheels 46 are mounted. During operation the wheels 46 roll freely upward and downwardly in the tracks 22 and 23. *An upward force exerted by the user on the body engaging means or body engaging portions of lifting arm 24 tends to impart an eccentric force to the carriage 21. When such force is applied to the carriage, the carriage will be moved along the track means shown here as tracks 22 and 23, and the wheel or bearing means shown here as wheels 46 will be in engagement with the track means to restrain the carriage from rotating or pivotal movement. This novel construction thus prevents the binding of the carriage and the concomitant introduction into the system of unwanted and impossible to graduate frictional resistance which would otherwise occur as a result of the application of an eccentric force to the carriage by the user of the apparatus.*

Figure 6:
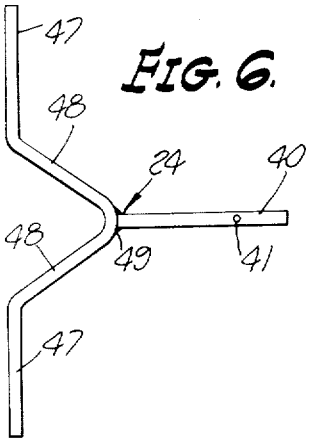
FIG. 6 is a plan view of a lifting arm for the apparatus of FIG. 2.
Figure 7:
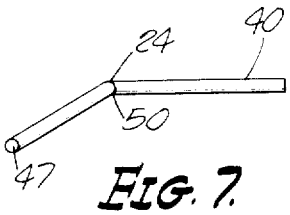
FIG. 7 is a side view of the lifting arm of FIG. 6.
Figure 14:
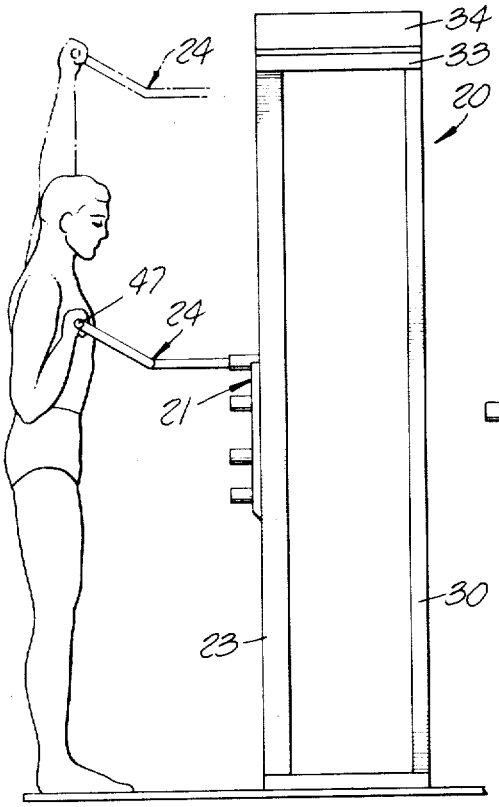
FIG. 14 is a view in side elevation of an apparatus embodying the principles of the present invention being used to execute a standing press.
Figure 15:
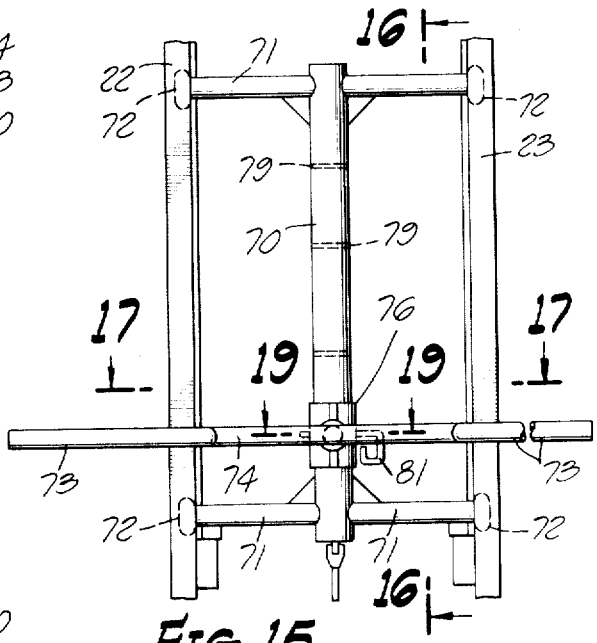
FIG. 15 is a view in front elevation showing details of another embodiment of a carriage and lifting arm for the apparatus of FIG. 2.
Figure 17:
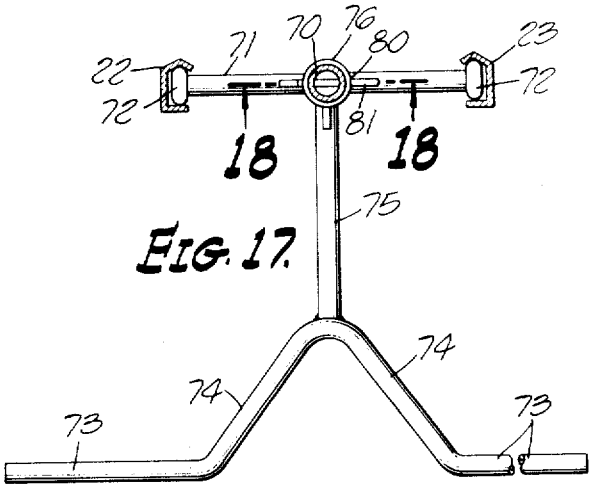
FIG. 17 is a plan view in section taken along the line 17—17 of FIG. 15.
Figure 16:
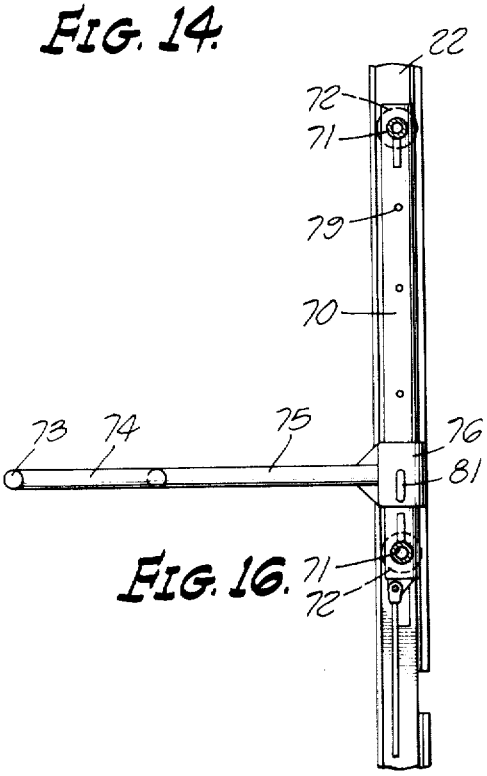
FIG. 16 is a side view in section taken along the line 16—16 of FIG. 15.
Figure 18:
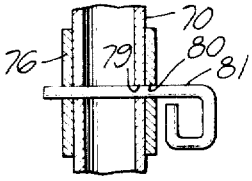
FIG. 18 is an enlarged fragmentary side view in section taken along the line 18—18 of FIG. 17.

Referring particularly to FIGS. 4, 6 and 7, the socket-engaging portion of the lifting arm 24 is adapted to fit into a selected socket 39 of the carriage 21. The body-engaging portions of the lifting arm 24 consist of horizontal coaxial handles 47 and shoulder-engaging portions 48 forming a "V." Portions 48 extend outwardly from their apex 49 to provide space to accommodate the head and neck of the user. The apex 49 is rigidly attached to the outer portion of the socket-engaging portion 40 so that the handles 47 lie in a plane below the plane in which the socket-engaging portion 40 lies. Thus the lifting arm 24 is bent as indicated at 50 (FIG. 7). The bent lifting arm coacts with the plurality of sockets 39 to provide a plurality of starting heights to in turn provide a plurality of exercises. Thus if a man of medium height desired to perform a supine press he would simply insert the end 40 of the lifting arm in the lowest socket with the handles 47 downward and secure the lifting arm in position by the pin 42. See FIG. 10. Likewise if a man of medium height desired to perform a sitting press, he would simply insert the end 40 of the lifting arm in the socket second from the bottom with the handles 47 upward and secure the lifting arm in position by the pin 42. See FIG. 11. Likewise, if a man of medium height desired to perform an upright row, he would simply insert the end 40 of the lifting arm in the socket second from the bottom with the handles 47 downward and secure the lifting arm in position by the pin 42. See FIG. 12. Likewise if a man of medium height desired to perform a squat, he would simply insert the end 40 of the lifting arm in the socket third from the bottom with the handles 47 downward and secure the lifting arm in position by the pin 42. See FIG. 13. And likewise if a man of medium height desired to perform a standing press he would simply insert the end 40 of the lifting arm in the uppermost socket with the handles 47 upward and secure the lifting arm in position by the pin 42.

Figure 8:
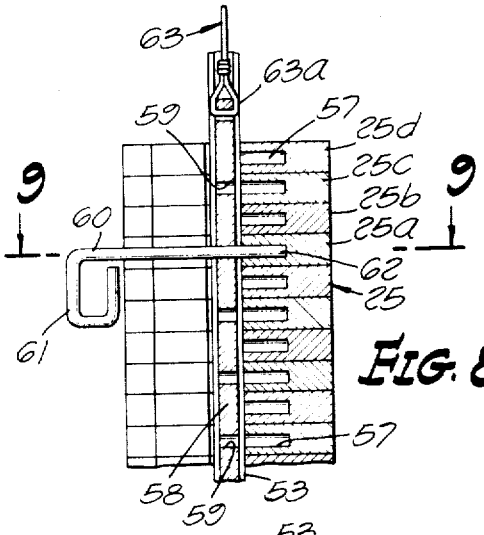
FIG. 8 is an enlarged fragmentary view in section of the weight system for the apparatus of FIG. 2 taken along the line 8—8 of FIG. 2.
Figure 9:
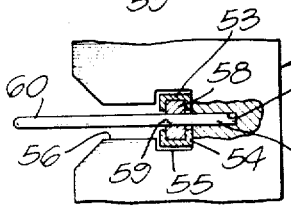
FIG. 9 is a plan view in section taken along the line 9—9 of FIG. 8.
Figure 12:
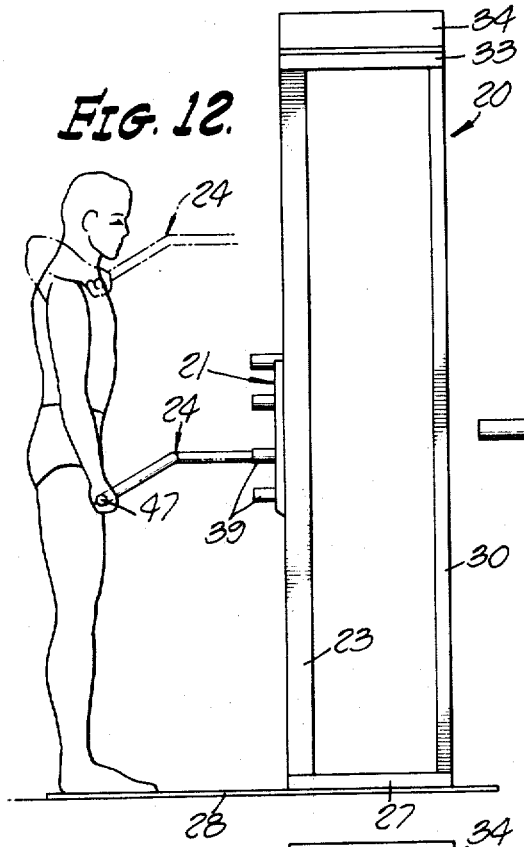
FIG. 12 is a view in side elevation of an apparatus embodying the principles of the present invention being used to execute an upright row.

Referring particularly to FIGS. 2, 8 and 9, inwardly of the vertical corner members 22, 23, 30 and 31 is a pulley support and weight-supporting platform 35, secured to the base members 26. Secured to the top of the pulley support and weight-supporting platform 35 is a weight support 51 which supports a pair of coil springs, each designated as 52. Secured to the top of the platform 51 and extending upwardly therefrom are two parallel, spaced channel-shaped bars 53 and 54, the channel openings facing each other, as indicated in FIG. 9.

Seventeen 10-pound weights designated generally as 25 surround and are slidably engaged with bars 53 and 54, the weights being directly supported on the coil springs 52. Each of the weights, as best seen in FIG. 9, has a generally rectangular central opening 55, having a configuration corresponding to that of the two bars 53 and 54 and being such that the weight can be placed in slidable engagement on the bars only by inserting the weight over the ends thereof. Extending outwardly from the central opening 55 is a reentrant portion or slot-shaped opening 56 which extends vertically through the weight. Opposite the opening 56 and extending inwardly from the opening 55 is a cylindrical hole 57.

Slidably engaged in the channels of the bars 53 and 54 is a weight selector bar 58, as best seen in FIGS. 8 and 9. The selector bar 58 has a plurality of spaced horizontal cylindrical openings 59, adapted to be in register, or to be moved into register, with a conveniently adjacent opening 57 in one of the weights. As shown in FIG. 8, a selector pin 60 has a handle 61 and a cylindrical pin 62 extending therefrom. The pin extends into the reentrant portion 56, an opening 59 in the selector bar and an opening 57 in the lowest weight, as 25a, of a group of weights, or of a single weight to be selected for movement upwardly with the selector bar. Thus, as indicated in FIGS. 2, 8 and 9, when the selector bar 58 is moved upwardly within the bars 53 and 54, the upper four weights, including 25a, 25b, 25c and 25d will be moved therewith. If it is desired to move more or fewer weights with the selector bar, then the pin 60 must be realigned with an opening 59 in the selector bar which in turn must be properly aligned with an opening 57 in the lowest weight desired to be selected.

A lower end 63a of a cable, generally designated as 63, is secured to the top of the selector bar 58 for raising the latter and the weights attached thereto by means of the pin 60. The cable 63 has an upwardly extending portion 63b between the bars 53 and 54, and further extends over a pair of horizontally aligned spaced pulleys 64 and 65.

The axles of the pulleys 64 and 65 are supported on the upper pulley support 34. The upper ends of the bars 53 and 54 are also supported and secured on the pulley support 34.

The cable 63 has a portion designated as 63c extending downwardly from the pulleys 64 and 65, and which extends over a pulley 66. The pulley 66 is supported on pulley support and weight platform 35. Extending upward from the pulley 66 is a cable portion designated as 63d. The upper end 63e of the cable 63 is secured to the carriage 21. Thus, with the selector pin in position as shown in FIG. 8, 40 pounds of weights will be lifted by upward movement of the carriage 21.

Referring particularly to FIGS. 15, 16, 17 and 18, there is shown another embodiment of a carriage and lifting arm for the apparatus of FIG. 2. The carriage includes a standard 70 and vertically aligned axles 71 rigidly secured thereto. Double rolled ball bearing wheels 72 are mounted on the axles 71. During operation of the apparatus the wheels 72 roll freely upwardly and downwardly in the tracks 22 and 23.

Figure 19:
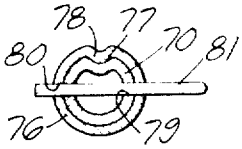
FIG. 19 is an enlarged fragmentary plan view in section taken along the line 19—19 of FIG. 15.

The lifting arm is comprised of integrally related horizontal coaxial handles 73, V-shaped shoulder-engaging portions 74, an intermediate portion 75 and a sleeve 76. The sleeve 76 is interlocked for upward and downward longitudinal movement with the standard 70. Referring particularly to FIG. 19, the standard 70 is deformed to provide a longitudinal groove 77 and the sleeve 76 is deformed to provide a longitudinal rib 78 to permit longitudinal movement and prevent rotational movement of the lifting arm.

The standard 70 is provided with a plurality of spaced transverse holes 79 and the sleeve 76 is provided with a transverse hole 80. As can best be seen in FIGS. 18 and 19, the holes 79 and 80 register for receiving the pin 81 to secure the lifting arm at the height desired. Thus, if the user desires to perform a supine press he simply moves the sleeve 76 downward on the standard 70 until the bottom hole 79 and the hole 80 are in register, and inserts the pin 81 to secure the lifting arm in position.

Figure 10:
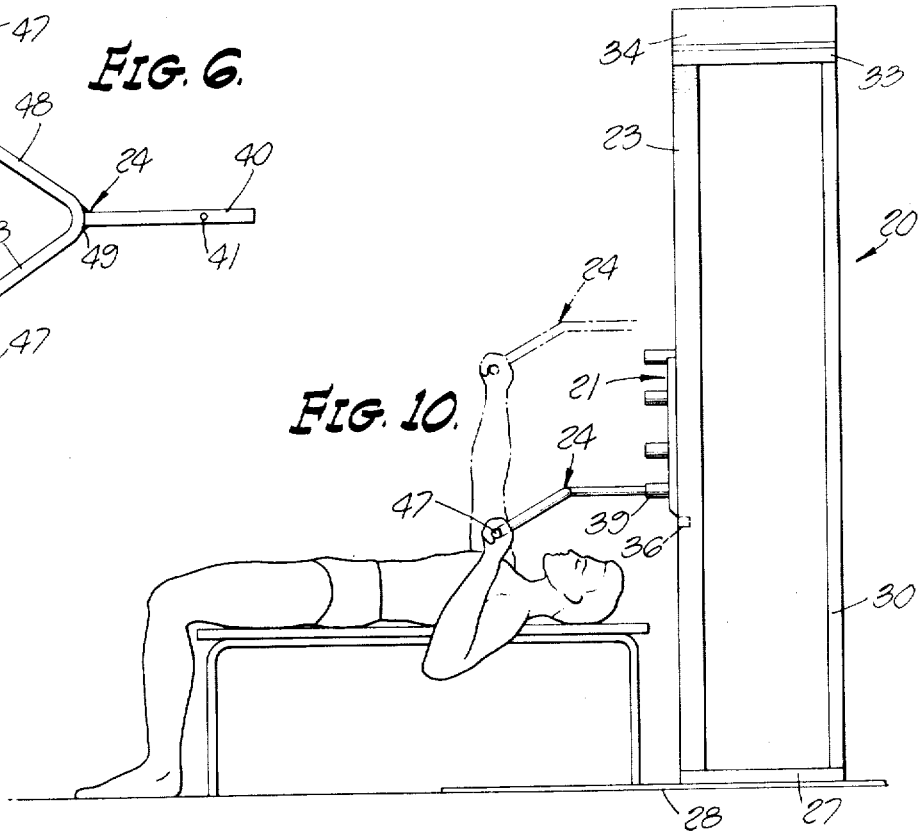
FIG. 10 is a view in side elevation of an apparatus embodying the principles of the present invention being used to execute a supine press.
Figure 11:
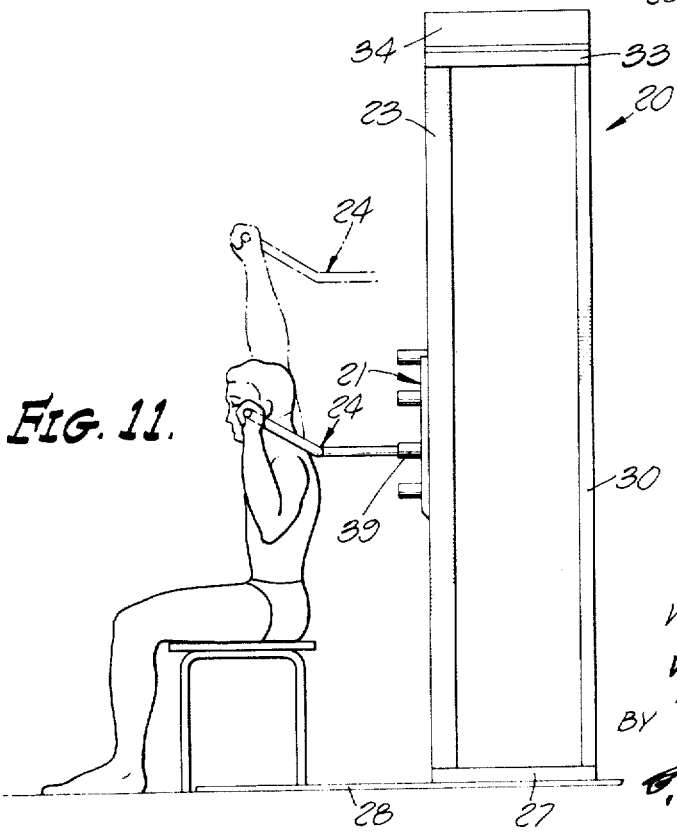
FIG. 11 is a view in side elevation of an apparatus embodying the principles of the present invention being used to execute a sitting press.

For operation, the user who desires to perform a supine press simply fits the end 40 of the lifting arm 24 in the lowest socket 39 of the carriage 21, and locks the lifting arm in position by the pin 42. He then selects the number of 10-pound weights he wishes to exercise his arm and chest muscles against by means of the selector pin 60. As shown in FIG. 8, 40 pounds of weights will be lifted by upward movement of the lifting arm 24 and carriage 21. After the desired number of weights has been selected, the user reclines in a supine position on a table and grasps the handles 47 of the lifting arm 24, as shown in FIG. 10. He thereupon, by exerting upward pressure on the handles 47, raises the carriage 21 out of engagement with the stop means 36, and raises and lowers the lifting arm 24 the desired number of repetitions. By reason of the fact that the wheels 46 of the carriage 21 to which the lifting arm is attached move upwardly and downwardly in the tracks 22 and 23, the user is able to exercise his arm and chest muscles in a straight line of travel from a position of complete muscle contraction to a position of complete muscle extension, as shown in FIG. 10.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific forms shown or uses mentioned except as defined in the accompanying claims, wherein various portions have been separated for clarity of reading and not for emphasis.

I claim:

1. A body-exercising machine comprising:

a. an upright supporting structure;

b. a vertically reciprocative slidable *carriage* [member] having a plurality of vertically spaced apertures therein;

c. guide means mounted on the upright supporting structure to guide said *carriage* [member] vertically;

d. a vertically adjustable body-engaging element extended outwardly from said *carriage* [member] for engagement *by* a trainee to impart vertically reciprocative movement to said *carriage, whereby a lifting force exerted on said body engaging element tends to apply an eccentric force to said carriage, said carriage including upper and lower wheel means to counteract the tendency to apply said eccentric force,* [member], said body-engaging element being vertically adjustable relative to said slidable *carriage* [member] into different vertical starting heights by introducing said body-engaging element into a selected aperture in said slidable *carriage* [member];

e. adjustable resistance means connected to said *carriage* [member] to bias it against vertically upward movement; and f. stop means mounted on the upright supporting structure to prevent vertical movement of said *carriage* [member] below a predetermined height.

2. The invention according to claim 1 in which said [member is a] carriage *has* [having] two sets of spaced-apart coaxial wheels adapted to roll on said guide means.

3. The invention according to claim 1 in which said guide means are two spaced-apart vertical parallel channel-shaped members.

4. The invention according to claim 1 in which said body-engaging element is substantially V-shaped with two coaxial transverse handles extending from the legs of the V, said V-shaped portion being adapted to accommodate the head and neck of the trainee and said handles being adapted to be grasped in the hands of the trainee.

5. The invention according to claim 1 in which said biasing means comprises:

a. a cable connected to the bottom of said *carriage* [member];

b. a lower pulley positioned below said *carriage* [member];

c. an upper pulley positioned above said lower pulley;

d. a plurality of *weights* integral to said machine;

e. said cable extending downwardly from said *carriage* [member] around said lower pulley, upwardly, around said upper pulley, downwardly and being connected to said weights; and f. said weights being slidably arranged on vertical means.

6. A self-contained body-exercising machine comprising:

a. free-standing upright supporting structure;

b. two spaced-apart vertical channel-shaped bars mounted on said upright supporting structure;

c. a vertically reciprocative carriage comprising a body portion having two vertically spaced-apart sets of coaxial wheels carried by said body portion and adapted to roll in said channel-shaped bars;

d. adjustable weight means supported in said upright supporting structure;

e. connecting means connected to said carriage and said adjustable weight means whereby said carriage is biased in a vertically downward direction;

f. body-engaging means connected to said carriage for movement therewith only in a vertical straight line direction and being vertically adjustable relative to said carriage whereby said body-engaging means may be adjusted into different vertical starting heights relative to said carriage; and g. fixed means mounted in said upright supporting structure for limiting downward movement of said carriage.

*7. A body exercising machine comprising:*

*(a) an upright supporting structure, including spaced apart substantially vertical track means;*

*(b) a carriage positioned between and adapted for straight-line movement along said track means, said carriage being supported in a predetermined starting position;*

*(c) body engaging means projecting laterally outwardly from said carriage, for moving said carriage upwardly along said track means, whereby when said body engaging means is pushed upwardly it tends to apply an eccentric force to said carriage, said body engaging means being vertically adjustable relative to said carriage whereby said body engaging means may be adjusted into different vertical starting heights relative to said carriage;*

*(d) upper and lower wheel means mounted on each side of said carriage, said wheel means engaging and rolling along said track means whereby said carriage will be moved along said track means and said wheel means will be in engagement with said track means to restrain said carriage from rotating movement and prevent the binding of said carriage;*

*(e) weight means supported in said upright supporting structure; and*

*(f) connecting means connecting said carriage and said weight means whereby said carriage is biased in a vertically downward direction, and whereby movement of said carriage in an upward direction will raise said weight means.*

*8. A body exercising machine comprising:*

*(a) an upright supporting structure, including spaced apart substantially vertical track means;*

*(b) a carriage positioned between and adapted for straight-line movement along said track means, said carriage being supported in a predetermined starting position;*

*(c) body engaging means projecting laterally outwardly from said carriage, for moving said carriage upwardly along said track means, whereby when said body engaging means is pushed upwardly it tends to apply an eccentric force to said carriage, said body engaging means being vertically adjustable relative to said carriage whereby said body engaging means may be adjusted into different vertical starting heights relative to said carriage;*

*(d) upper and lower bearing means mounted on each side of said carriage, said upper and lower bearing means engaging and moving along said track means whereby said carriage will move vertically and said bearing means will be in engagement with said track means to restrain said carriage from rotating movement;*

*(e) weight means supported in said upright supporting structure; and*

*(f) connecting means connecting said carriage and said weight means whereby said carriage is biased in a vertically downward direction, and whereby movement of said carriage in an upward direction will raise said weight means.*

References Cited

The following references, cited by the Examiner, are of record in the patented file of this patent or the original patent.

UNITED STATES PATENTS

| | | | |
|---|---|---|---|
| 323,792 | 8/1885 | Coop et al. | 272—81 |
| 2,932,509 | 4/1960 | Zinkin | 272—81 X |
| 3,346,256 | 10/1967 | White | 272—81 |
| 2,977,120 | 3/1961 | Morris | 272—81 |

FOREIGN PATENTS

| | | |
|---|---|---|
| 177,631 | 12/1961 | Sweden. |

DELBERT B. LOWE, Primary Examiner